United States Patent
Chapman

(10) Patent No.: US 9,243,371 B2
(45) Date of Patent: Jan. 26, 2016

(54) ADJUSTABLE WIDTH AND FOLDING CAMERA DOLLY TRACK

(71) Applicant: Chapman/Leonard Studio Equipment, Inc., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 97 days.

(21) Appl. No.: 14/280,274

(22) Filed: May 16, 2014

(65) Prior Publication Data

US 2015/0330032 A1    Nov. 19, 2015

(51) Int. Cl.
*E01B 23/00* (2006.01)
*F16M 11/42* (2006.01)

(52) U.S. Cl.
CPC ............... *E01B 23/00* (2013.01); *F16M 11/42* (2013.01)

(58) Field of Classification Search
CPC ............. E01B 5/16; E01B 5/18; E01B 23/02; E01B 23/00; E01B 25/00
USPC ............................. 238/31, 32, 35, 51, 50, 37
See application file for complete search history.

(56) References Cited

U.S. PATENT DOCUMENTS

| | | | |
|---|---|---|---|
| 779,964 A * | 1/1905 | Porter | E01B 3/22 238/26 |
| 3,899,164 A | 8/1975 | Newman | |
| 4,943,101 A | 7/1990 | Chapman | |
| D376,460 S | 12/1996 | Isaia et al. | |
| 5,609,108 A | 3/1997 | Chapman | |
| 5,711,227 A | 1/1998 | Johnson | |
| 5,887,787 A | 3/1999 | Saldana, III | |
| 6,435,421 B1 | 8/2002 | Peterson | |
| 6,557,775 B1 | 5/2003 | Brinson et al. | |
| 8,142,019 B2 | 3/2012 | Hernandez | |
| 8,282,018 B2 * | 10/2012 | Kennard | E01B 23/02 238/10 R |

FOREIGN PATENT DOCUMENTS

JP    05-311601 A    11/1993
WO    WO 99/41455    *    8/1999

OTHER PUBLICATIONS

International Searching Authority, Korean Intellectual Property Office, The International Search Report and the Written Opinion issued in International Application No. PCT/US2015/030901 (Aug. 19, 2015).
Chapman Leonard Studio Equipment, Inc., "Precision Telescoping Light I-Beam Track", Item #11600 (Dec. 2005).

* cited by examiner

*Primary Examiner* — Mark Le
(74) *Attorney, Agent, or Firm* — Kenneth H. Ohriner; Perkins Coie LLP

(57) ABSTRACT

Camera dolly track has adjustable width and is foldable for transport or storage. A track section has first and second rails connected via first and second cross braces. The cross brace includes a first bar pivotally attached to the first rail, and a second bar pivotally attached to the second rail. The first bar is securable onto the second bar at multiple positions along the second bar, to change the length of the cross brace to allow a track width of the dolly track to be changed. The length of the cross brace may be changed via a straight slot in the first bar and at least one projection in the second bar extending into the slot, to allow the bars to slide in and out over each other.

13 Claims, 6 Drawing Sheets

ADJUSTABLE WIDTH AND FOLDING CAMERA DOLLY TRACK

BACKGROUND OF THE INVENTION

In motion picture, video and television production, smooth camera movement is essential. To this end, the camera is often supported on a camera dolly, especially for tracking shots where the camera is moved to follow the subject. The camera dolly is typically pushed or driven with the camera dolly wheels rolling on the ground. However, when filming on outdoor sets such as grass, snow, beaches or other uneven surfaces, dolly track is used. Dolly track generally has two tubular parallel rail sections joined by spreaders or ties, similar to railroad track. The wheels of the camera dolly are adapted to fit onto the rails.

The track is provide in straight and curved sections of varying lengths, with the sections joined together to provide the desired track route. The track provides a uniform and rigid surface for the dolly to allow for smooth filming. With some types of track, the rails are pivotally attached to the spreaders, to allow the track sections to fold inwardly for storage or transport. Although various forms of camera dolly track have been used, improvements are needed to provide better performance and versatility.

BRIEF DESCRIPTION OF THE DRAWINGS

In the drawings, the same number indicates the same element in each of the views.

DETAILED DESCRIPTION OF THE DRAWINGS

Figure 1:
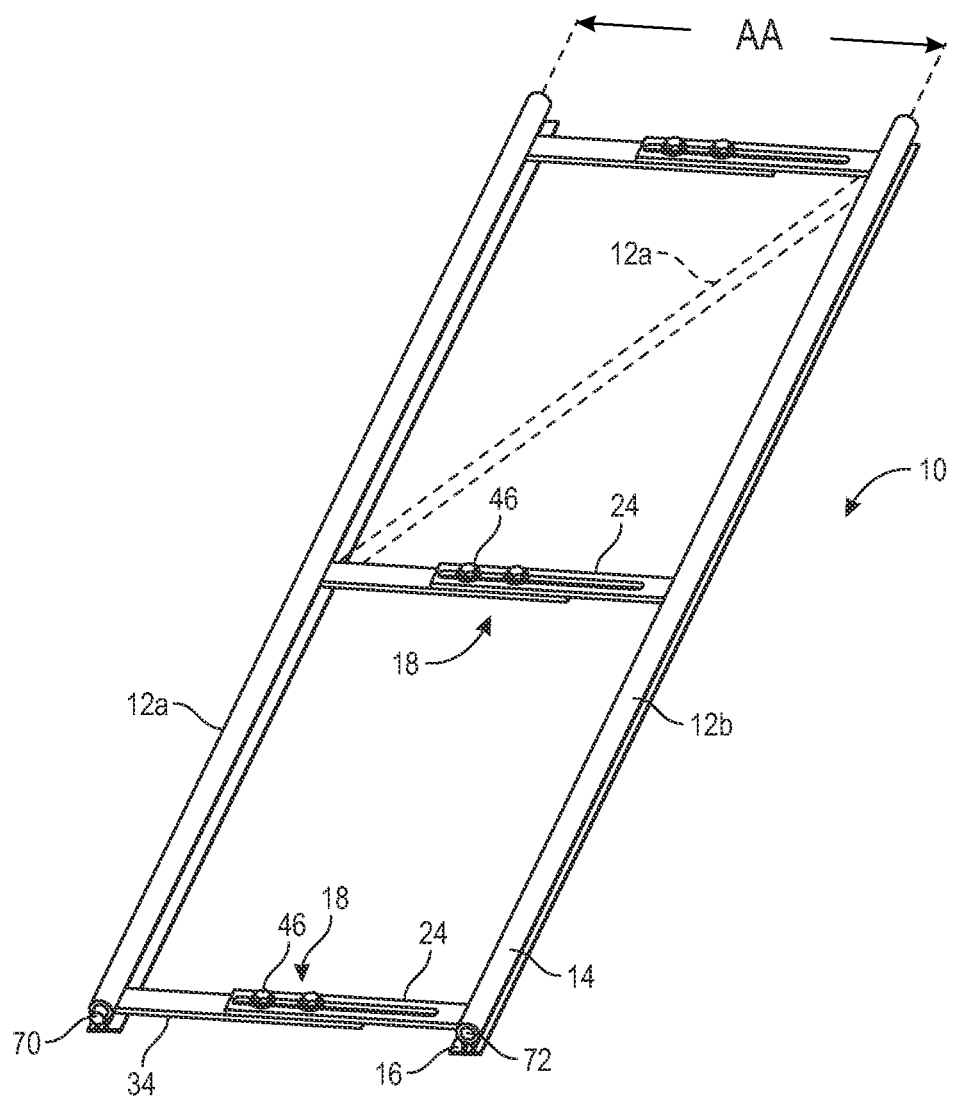
FIG. 1 is a perspective view of a straight track section set at a maximum width.
Figure 2:
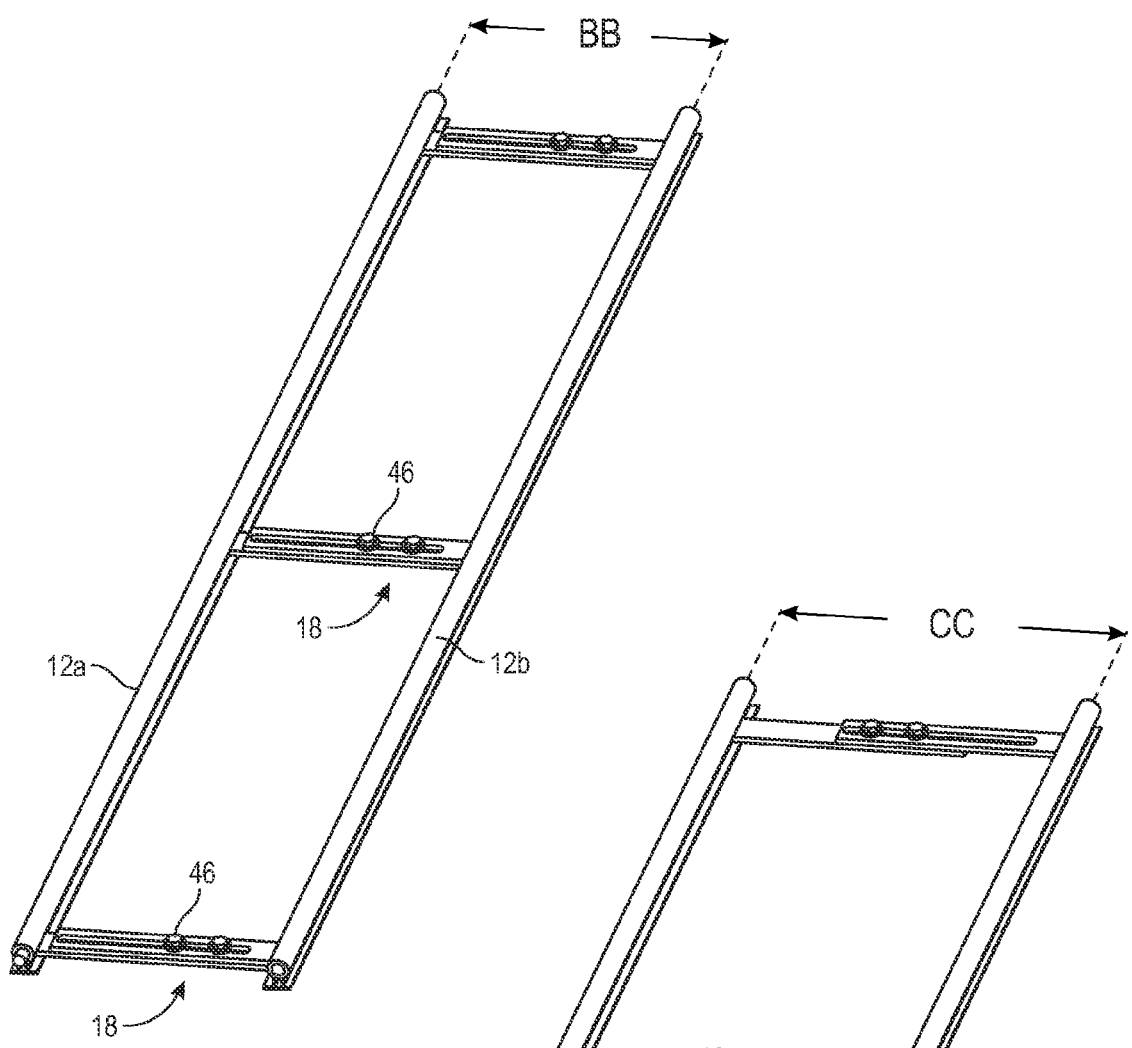
FIGS. 2 and 3 are perspective views of the track section of FIG. 1 set at minimum and intermediate widths, respectively.
Figure 3:
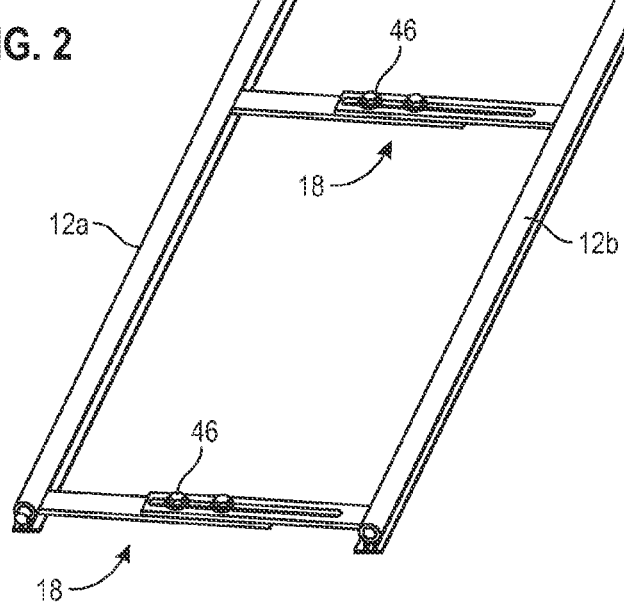
Figure 11:
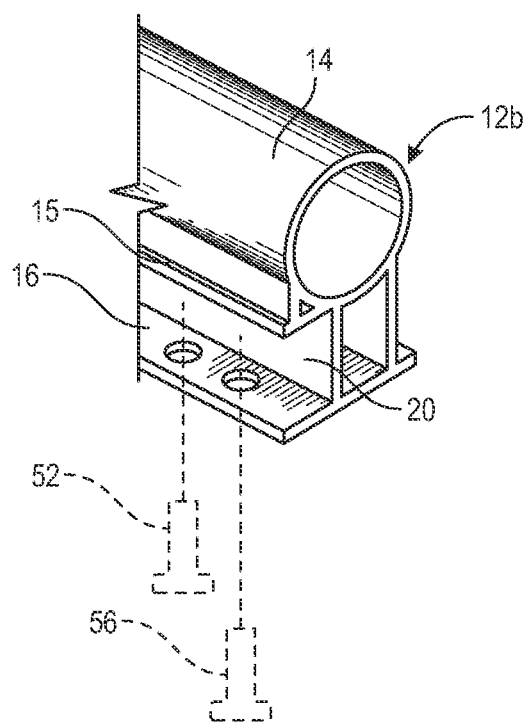
FIG. 11 is a perspective view of a rail of the track section shown in FIG. 1.

As shown in FIGS. 1-3, a track section 10 has rails 12A and 12B attached to cross braces 18. Referring further to FIG. 11, each rail typically has a tube 14 joined to a base having a lower inner flange 16. The rails may be aluminum extrusions, as shown for example in U.S. Pat. No. D376,460, incorporated herein by reference.

Figure 4:
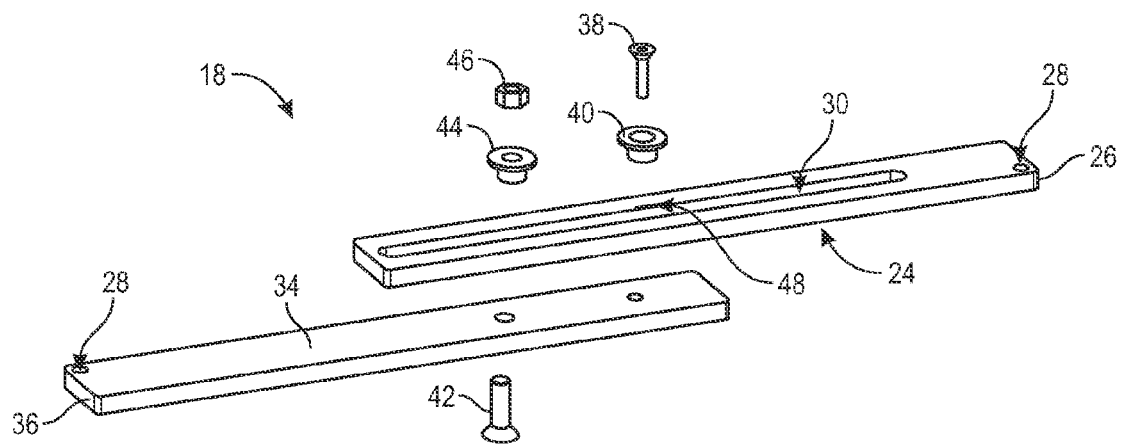
FIG. 4 is an exploded perspective view of a cross brace as shown in FIG. 1.
Figure 5A:
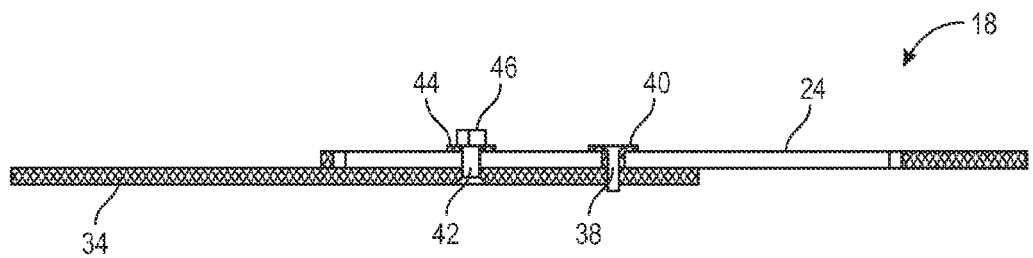
FIG. 5A is a partial section view of the cross brace shown in FIG. 4.
Figure 5B:
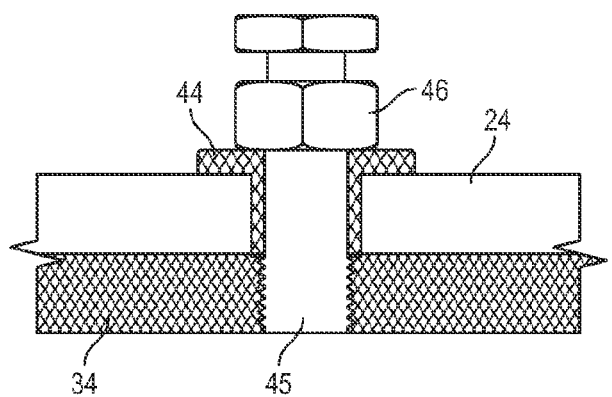
FIG. 5B is a partial section of an alternative cross brace.
Figure 6:
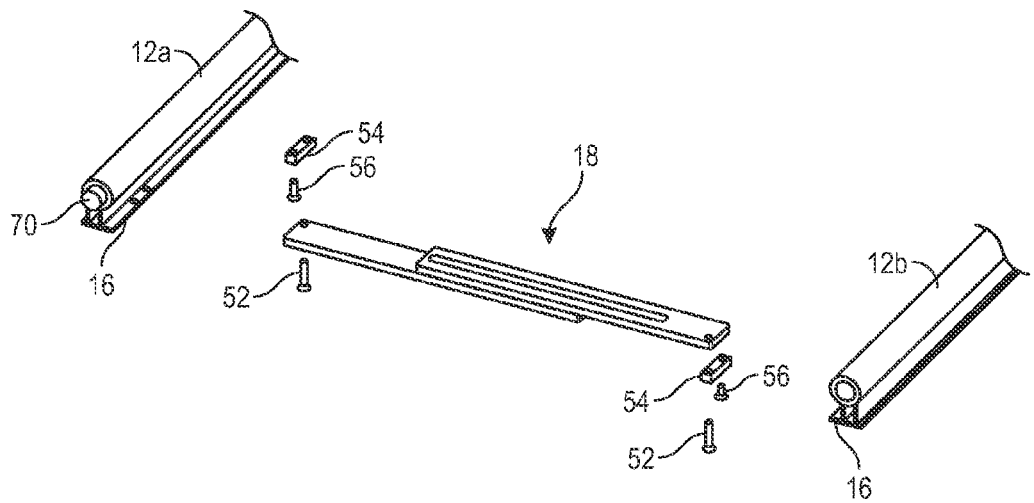
FIG. 6 is an exploded perspective view of the cross brace and rails shown in FIG. 3.

Turning to FIGS. 4-6, each cross brace 18 has a slot bar 24 and a pin bar 34. A pin hole 28 is provided at the outer end 26 of the slot bar 24, and at the outer end 36 of the pin bar 34. A slot 30 extends from the inner end towards the outer end 26 of the slot bar 24. A threaded fastener such as a bolt or stud 42 may be attached at a fixed position on the pin bar 34. In the example shown a flathead bolt 42 is shown positioned in a countersunk hole in the pin bar 34. Alternatively a threaded stud may be pressed into the pin bar, welded, or otherwise permanently attached to the pin bar. As shown in FIG. 5, a bushing 44 may be provided on the bolt 42.

A nut 46 is threaded onto the top end of the bolt 42. A threaded knob, lever or wing nut may optionally be used instead of the nut to allow for adjusting the width of the track without the need for a wrench or other tools. The bolt 42 and nut 46 may be replaced by a cam lever, clamp or similar device that allows for quick locking and releasing action without use of tools. The term fastener as used here includes bolts and nuts, threaded knobs, handles or levers, as well as cams and similar non-threaded fasteners and clamping devices.

Referring FIGS. 4-5, a pin 38 may be attached to the pin bar 34 at a fixed position spaced apart from the bolt 42 by e.g., 5-25 cm. The pin 38 also extends through the slot 30, and may also be surrounded by a pin bushing 40. The bushings 40 and 44 may be non-metallic bushings having a body with a diameter nominally smaller that the width of the slot 30, to allow the slot bar 24 and the pin bar 34 to slide relative to each other, while keeping the bars parallel to each other. The slot 30, the bolt 42 and the pin 38 are dimensioned and positioned to allow the slot bar and the pin bar to slide relative to each other to position the rails 12A and 12B to the widths or spacings shown in FIGS. 1 and 2. As shown in FIG. 1, the maximum width may be automatically set via the bolt 42 contacting the inner end of the slot 30. As shown in FIG. 2, the minimum width may be automatically set via the pin 38 contacting the outer end of the slot 30.

As shown in FIG. 5B, in an alternative design the bolt 45 may be permanently threaded into the pin bar 34, with the nut 46 captive on the bolt 45 via the bolt head. In this design, neither of the bolt 45 or the nut 46 is separable from the cross brace, so that they cannot be lost during use or transport of the track section 10.

With the track 10 set at the maximum width as shown in FIG. 1, the rails 12A and 12B may be spaced apart on 62.2 cm (24.5 inch) centers, which is an industry standard for many camera dollies. With the track 10 set at the minimum width as shown in FIG. 2, the rails 12A and 12B may be spaced apart on 40.6 cm (16 inch) centers, adapted for certain camera dollies having adjustable width legs, and for certain pedestals. The track 10 as shown in FIG. 2 can fit through narrow openings, such as doorways, providing improved versatility.

As shown in FIG. 4, one or more notches or countersunk holes 48 may be provided in the slot 30 of the slot bar 24 at predetermined positions, to allow the cross brace 18 to be easily set to an intermediate track width. For example, the notch 48 positioned as shown in FIG. 4 indicates that the rails are in the intermediate position shown in FIG. 3, where the rails are spaced apart on 55.4 cm (21.825 inch) centers, when the bolt 42 is at the notch 48. Engraved calibration markings may optionally be provided on the slot bar 24 and/or on the pin bar 34 to allow the user to select a desired intermediate track width.

Figure 7:
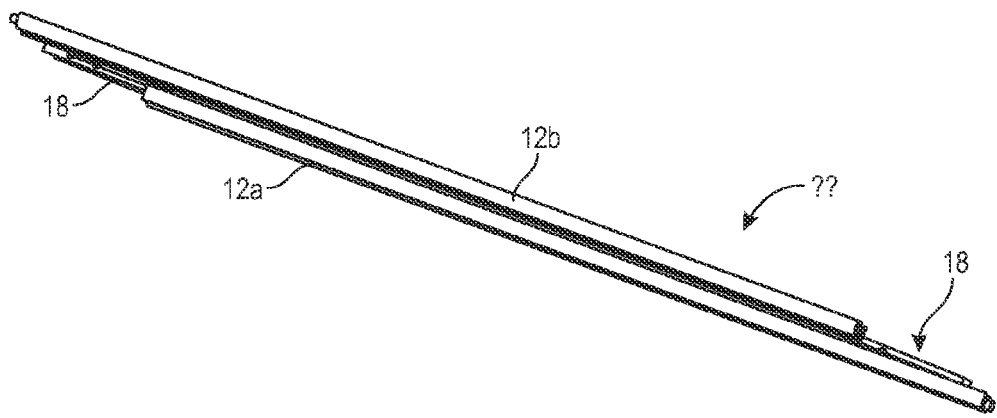
FIG. 7 is a perspective view of the track section of FIG. 1 in a folded position for storage and transport.

Turning to FIG. 6, one end of a spacer 54 is attached to the lower inner flange 16 of the right rail 12B via a spacer fastener 56. A pivot bolt or pin 52 extends through the inner flange 16, the other end of the spacer 54, and through the outer end 26 of the slot bar 24, so that the slot bar is pivotally attached to the rail 12B. If the rail has also has upper inner flange 15 as shown in FIG. 11, the spacer fastener 56 and the pivot bolt 52 may be threaded into the upper inner flange 15, or threaded into a nut on top of the upper inner flange 15. The pin bar 34 is similarly attached to the inner flange 16 of the left rail 12A. As a result, the ends of the cross brace 18 are pivotally attached to the rails. This allows the track section 10 to be folded into the more compact configuration shown in FIGS. 7-10. As shown in FIG. 6, the spacer 54 at the right rail 12B is underneath the outer end 26 of the slot bar 24, while the spacer 54 at the left rail 12B is above the outer end 36 of the pin bar 34, so that the cross brace 18 is horizontal or level. Referring to FIG. 7, the length of the folded track section 10 may be minimized if the track section 10 is first set at its narrowest configuration as shown in FIG. 2, before folding the track section 10 into the configuration shown in FIG. 7.

Figure 12:
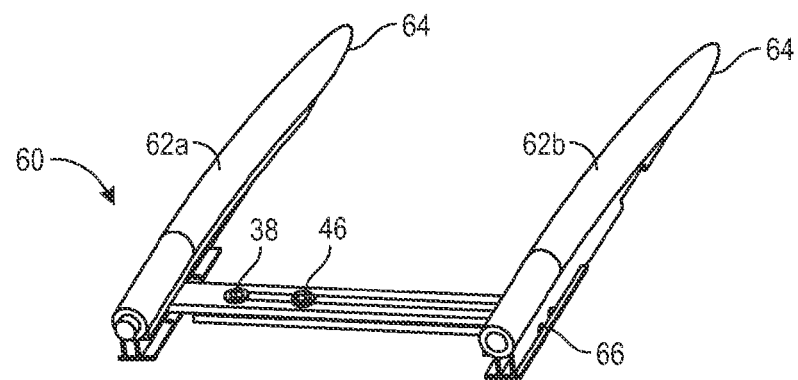
FIGS. 12, 13, and 14 are perspective views of a starting or ramp track section set at minimum, intermediate, and maximum widths.
Figure 13:
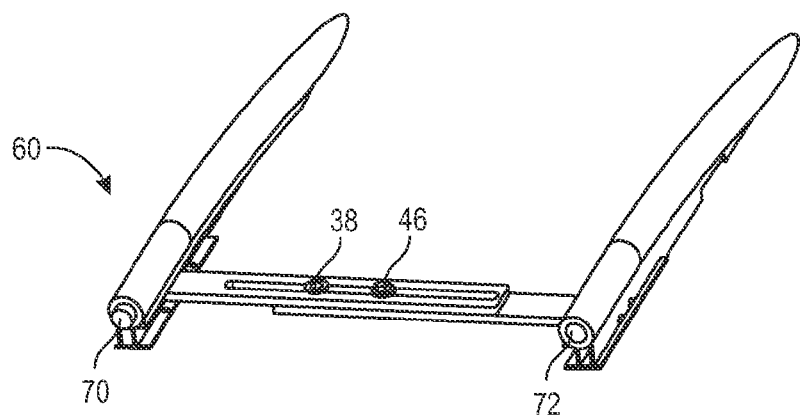
Figure 14:
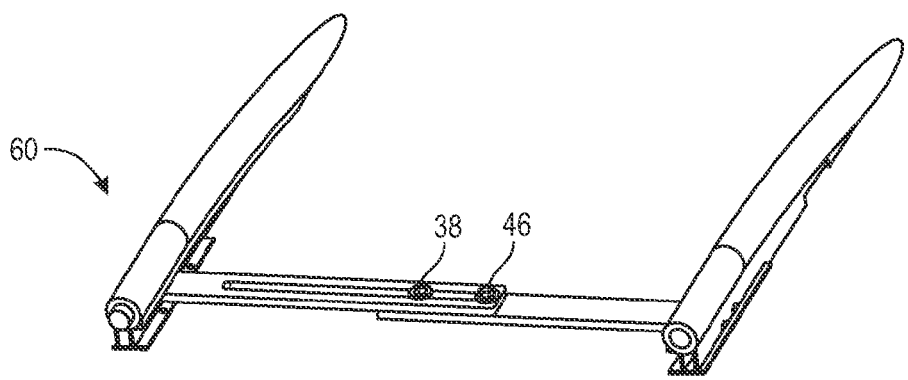

FIGS. 12-14 shown a starting or ramp track section 62 which in use is attached to the track section 10. The ramp section 62 allows the dolly to be rolled up onto the track, avoiding the need for lifting the dolly, which together with the payload (e.g., the camera, batteries, and accessories) may weigh over 200 kg. The ramp section 62 includes ramp tubes 62A and 62B having flat surfaces 64 at one end adapted to rest on the ground or floor. The opposite ends of the ramp tubes 64 are adapted to engage with the tubes 14 of the track section 10. For this purpose, a tapered plug 70 may be provided on one ramp tube 62 and a tapered receptacle 72 provided on the other ramp tube. The track section may similarly have tapered plugs and receptacles for attachment to adjoining track sections.

Referring to FIG. 12, the ramp section 62 may include the same cross brace 18 as used in the track section 10. However, the cross brace 18 may be rigidly attached to the ramp tubes 62A and 62B at right angles, rather than pivotally attached. The rigid attachment of the cross brace 18 may be achieved via end bolts 66 extending through the ramp tubes 62A and 62B, or the flange structure attached to them, with the end bolts threaded into the ends of the slot bar 24 and the pin bar 34. Other forms or rigid and or permanent attachment may also be used, such as welding, riveting, adhesives, etc.

In use, the rails of the ramp section 60 are set at the desired track width by loosening the nut 46 and sliding the tubes 62 towards or away from each until they are at the desired spacing. The nut is then tightened so that the cross brace is set at a fixed width. Since the cross brace 18 is rigidly attached to the tubes 62, locking the cross brace at a fixed width also locks the tubes at a fixed width.

Next, a track section 10 is joined to the ramp section 60, with the nuts 46 on the cross braces 18 loosened, to allow the rails 12A and 12B to be moved in or out to align with the tubes 62 of the ramp section 60. The tapered plugs 70 and receptacles 72 may be used to help align and join the tubes together. The spacing of the rails 12A and 12B of the track section 10 is therefore set by the spacing of the tubes 62 of the ramp section 60. The nuts 46 on the track section 10 are then tightened, locking the cross braces 18 into a fixed length. Since the rails 12A and 12B are pivotally attached to the cross braces 18, locking the cross braces does not lock the rails into a fixed width. However, the tubes 62 of the ramp section are locked at a fixed width, so that the rails 12A and 12B are corresponding locked into a fixed width when the rails are joined to the tubes 64.

The ramp section 60 and the track section 10, as well as adjoining track sections 10, may be secured together with hooks or latches. Curved sections of track may be provided as well, with the rails having permanent radii and spacing. The track section 10 may be attached to a curved section of track in the same way as it is attached to the ramp section 60 as described above. As rail spacing of the curved sections of track is fixed, attaching a track section 10 to a curved section also locks the rails 12A and 12B of the track section 10 into a fixed width. The track section 10 may be provided in various lengths, typically in multiples of 61 cm (24 inches), with the number of cross braces 18 varying with the length of the track section. The cross braces 18 may be longitudinally spaced apart by 61 to 244 cm, and typically at about 122 cm.

Figure 8:
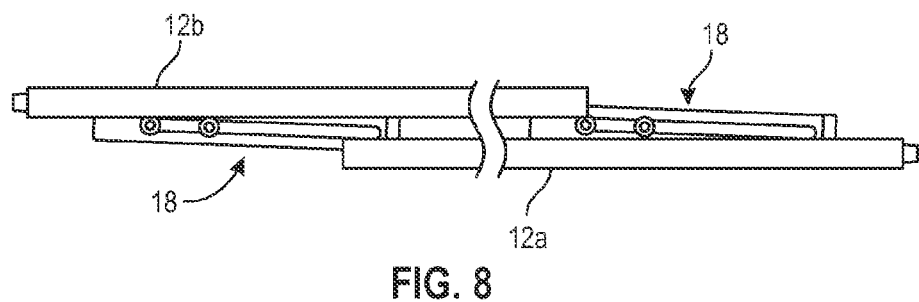
FIG. 8 is a top view of the track section as shown in FIG. 7.
Figure 9:
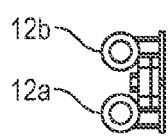
FIG. 9 is an end view of the track section of FIG. 8.

As shown in FIGS. 7-8, after use, the track section 10 may separate from the ramp section 60 and folded into a compact configuration where spacing between the rails may be as little as 16, 14, 12 or 10 cm (4 inches). The tubes 62A and 62B of the ramp section 60 do not fold. However, since the ramp section 60 is short e.g., 61 cm, it is relatively compact even without folding.

Figure 10:
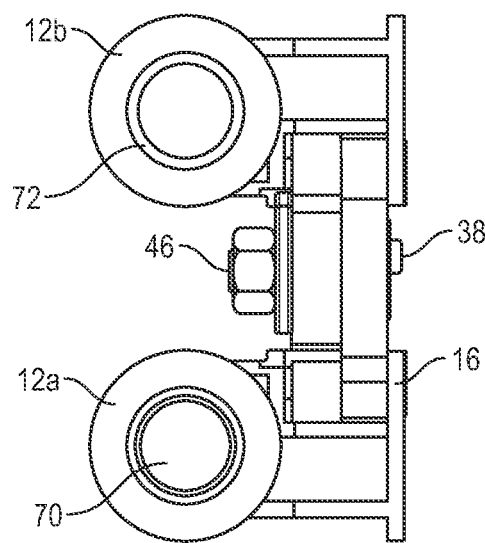
FIG. 10 is an enlargement of view of FIG. 9.

The track sections 10 may optionally be used without the ramp section 60. In this case, the dolly may be lifted up onto the rails. Referring to FIG. 10. the track 10 may be designed so that when fully unfolded, the flat ends 26 and 36 of the pin bar and the slot bar move into contact with a wall 20 of the rail 12A and 12B, shown in FIG. 11. The wall 20 provides a hard stop which prevents the cross brace 18 from pivoting past 90 degrees. A diagonal lock bar 22, as shown in dotted lines in FIG. 1, may therefore be used to hold the track section 10 into the fully unfolded position with the rails spaced apart at a fixed track width dimension.

The slot bar and the pin bar may be provided as solid rectangular cross section aluminum bars. As the slot bar slides over the pin bar to set the track width, jamming or gauling is avoided, even when used on sand, soil, mud, etc.

Thus, novel dolly track and methods have been shown and described. Various changes and substitutions may of course be made without departing from the spirit and scope of the invention. The invention, therefore, should not be limited, except to the following claims and their equivalents.

The invention claimed is:

1. Camera dolly track, comprising:
 a folding track section including:
  first and second rails connected via first and second cross braces, with each rail having a tube and a flange, and with each cross brace including a first bar pivotally attached to a first spacer attached to the flange of the first rail, and a second bar pivotally attached a second spacer attached to the flange of the second rail, with the first bar on top of the second bar;
  each first bar having a slot and each second bar having a bolt extending vertically through the slot in the first bar, and a fastener threaded onto the bolt, with the length of each cross brace adjustable by loosening the fastener and sliding the first and second bars of each cross brace relative to each other, and with the pivotal attachment of the first and second bars to the first and second spacers leaving the rails free to move relative to each other; and
 a non-folding ramp section including:
  third and fourth rails rigidly connected to a third cross brace, with third and fourth rails each having a flat end surface for resting on a floor, and the third bar having a slot and the fourth bar having a bolt extending vertically through the slot in the third bar, and a fastener threaded onto the bolt on fourth bar, with the length of third cross brace adjustable by loosening the fastener on the bolt on the fourth bar and sliding the third and fourth bars relative to each other, with the third rail adjoining the first rail and with the second rail adjoining the fourth rail.

2. The camera dolly track of claim 1 with the second bar of the first cross brace having a pin extending vertically into the slot of the first bar of the first cross brace.

3. The camera dolly track of claim 1 with the fastener on the bolt of each second bar comprises a threaded nut, knob or lever.

4. The camera dolly track of claim 1 with the first and second bars of the first and second cross braces, and the third and fourth bars of the third cross brace, each comprising a flat bar having a rectangular cross section.

5. The camera dolly track of claim 4 with each flat bar having four sides, a top surface and a bottom surface, and with the bolt of each cross brace extending through the flat bar from the bottom surface to the top surface.

6. The camera dolly track of claim 5 with the first bar of the first cross brace slidable relative to the second bar of the first cross brace while the top surface of the second bar is flat against the bottom surface of the first bar.

7. Folding camera dolly track, comprising:
   first and second rails each having a tube and a lower inner flange and an upper inner flange;
   a first spacer attached to the lower inner flange of the first rail;
   a second spacer attached to the upper inner flange of the second rail;
   a first cross brace including a first bar pivotally attached to the first spacer, and a second bar pivotally attached to the second spacer, with the first bar on top of the second bar;
   a slot in the first bar and a first bolt on or in the second bar extending vertically into the slot in the first bar, and a first fastener threaded onto the first bolt;
   a third spacer attached to the lower inner flange of the first rail;
   a fourth spacer attached to the upper inner flange of the second rail;
   a second cross brace spaced apart from the first cross brace, with the second cross brace including a third bar pivotally attached to the third spacer, and a fourth bar pivotally attached to the fourth spacer, with the third bar on top of the fourth bar;
   a slot in the third bar and a second bolt on or in the fourth bar extending vertically into the slot in the third bar, and a second fastener on the second bolt;
   with a length of the first and second cross braces adjustable by loosening the first and second fasteners and sliding the first and third bars relative to the second and fourth bars.

8. The camera dolly track of claim 7 with the fastener comprising a nut, or a knob or lever threaded onto the first bolt.

9. The camera dolly track of claim 7 with the first and second cross braces each further including a pin on the first bar extending vertically into the slot in the second bar.

10. The camera dolly track of claim 7 further including a diagonal lock bar positioned to hold the first and second rails apart by a fixed dimension.

11. The camera dolly track of claim 7 with the first and second bars of the first and second cross braces, and the third and fourth bars of the third cross brace, each comprising a flat bar having a rectangular cross section.

12. The camera dolly track of claim 11 with each flat bar having four sides, a top surface and a bottom surface, and with the bolt of each cross brace extending through the flat bar from the bottom surface to the top surface.

13. The camera dolly track of claim 12 with the first bar of the first cross brace slidable relative to the second bar of the first cross brace while the top surface of the second bar is flat against the bottom surface of the first bar.

* * * * *